Oct. 3, 1967 L. C. ROTH 3,344,518
LEATHER TOOLING IMPLEMENT
Filed May 6, 1966

LOUIS C. ROTH
INVENTOR.

BY Hazard & Miller
ATTORNEYS 3,344,518
LEATHER TOOLING IMPLEMENT
Louis C. Roth, Torrance, Calif., assignor to Tandy Leather Company, Fort Worth, Tex., a corporation of Texas
Filed May 6, 1966, Ser. No. 548,271
3 Claims. (Cl. 30—164.9)

This invention relates to a leather cutting tool of the type used for tooling leather.

It is an object of the invention to provide such a tool which is extremely simple in construction and which may be formed entirely of suitable plastic materials so that it can be produced in large quantities at an extremely low price.

Another object of the invention is to provide a leather cutting tool of the type described which, although very cheap to produce, is detachable for tooling leather in the same manner as some expensive tools.

A further object of the invention is to provide a leather cutting tool made up of a body portion, a separate relatively movable finger saddle and a separate cutter shank wherein simple yet highly effective means is provided for holding the several parts together and for retaining the cutter shank in the body against rotation relative to the body.

The above and other objects will more fully appear from the following description in connection with the accompanying drawing.

Figure 1:
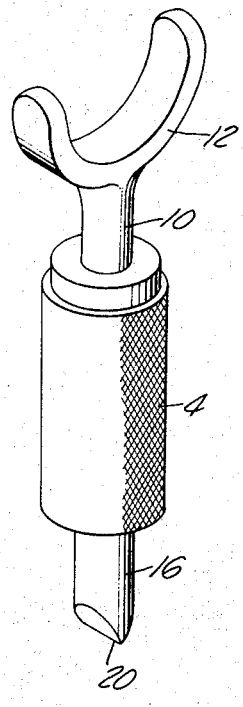
FIG. 1 is a perspective view of the tool.
Figure 2:
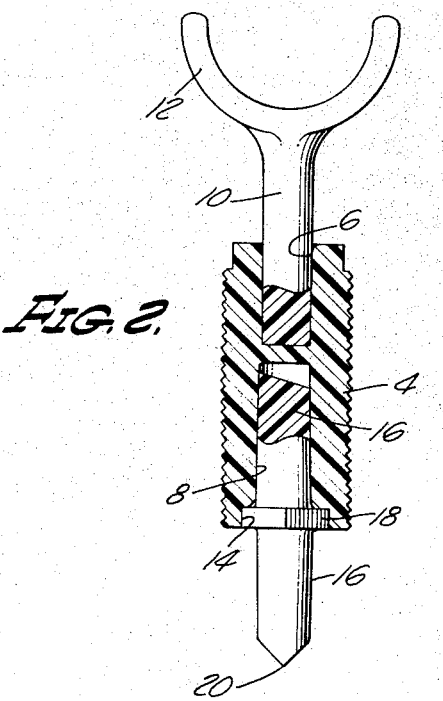
FIG. 2 is a side elevational view partially in vertical section.
Figure 3:
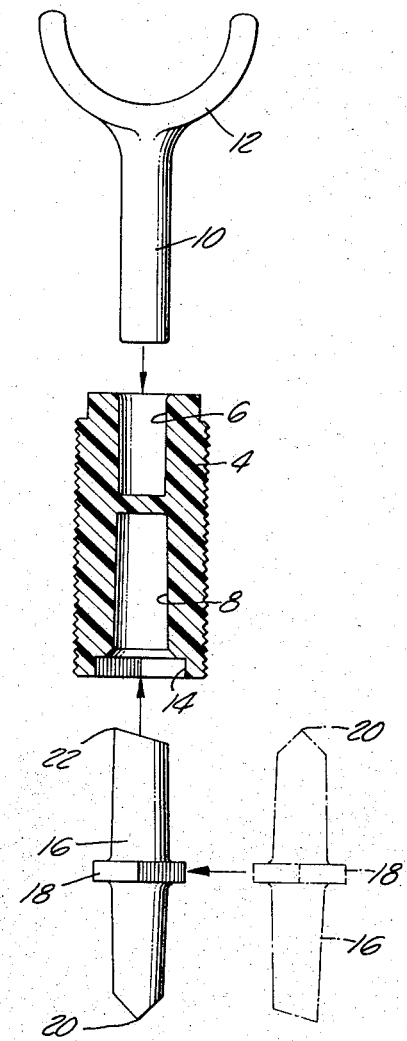
FIG. 3 is an exploded view with the body portion in vertical section and the cutter shank in a reversed position in broken lines.

The tool comprises an exteriorly cylindrical body 4 whose outer surface may be knurled as indicated. Said body portion is provided with an upper socket portion 6 and a lower socket portion 8. Removably receivable in the upper socket portion 6 is the spindle 10 of a finger saddle 12, said spindle 10 being rotatable in said upper socket portion 6. The finger saddle 12 is preferably formed of a suitable plastic material and it and the body 4 can economically be formed by injection molding.

The lower socket portion 8 of the body 4 has a tapered side wall as indicated, the lower end of said socket being wider than the upper inner end. At the bottom of the lower socket 8 is an enlargement 14 which is of noncircular shape. It is indicated as being substantially square and of greater cross-sectional extent than the remainder of the socket 8.

Removably receivable in the socket 8 is a cutter shank 16 having a medial enlarged squared portion 18. Either end of the shank 16 is receivable in the bottom socket 8 with the squared portion 18 nonrotatably received in the squared recesses 14 in the body. One end of the cutter shank 16 is provided with a suitable cutting edge 20 and the other end with a different type of cutting edge 22. These cutting edges are well understood in the art to provide different type of cuts in the leather. Obviously, specifically different cutting edge arrangements can be used.

The finger saddle spindle 10 is freely rotatable in its socket portion 6. If it is desired to releasably retain it in the socket so that it will not drop out in use, such retention can be secured by applying a small amount of petroleum jelly or other suitable substance to the spindle 10. This not only provides lubrication for free rotation but, by reason of the relatively close fit of the spindle 10 in its socket, said spindle will be adequately retained.

The cutter shank 16 and its socket 8 are so formed that the shank can be pressed into frictional engagement with and retained in the socket against displacement, the squared portion 18 of the cutter shank being seated in the recess 14 of the body to hold the shank against rotation relative to the body 4. Obviously, either end of the cutter shank 16 can be seated in the socket 8 depending upon which of the cutter edges 20 or 22 is to be used.

In use, the forefinger of one's hand is placed in the finger saddle 12 and pressure applied to press the desired cutting edge into the leather. When a cut is being made on a curve, the thumb and middle finger can be used to partially rotate the body 4 with similar rotation of the cutter shank 16.

The body 4 and finger saddle 12 can be made of any suitable plastic. The same is true of the cutter shank 16 but it is preferred that at least said cutter shank be made of a hard synthetic protein-like polyamide. Such a material can be made rather hard and tough so that the cutting edges 20 and 22 will remain sharp for a reasonable period of use, when such period is considered in view of the extremely low cost for which the article can be manufactured and sold. For example, it can be used in an inexpensive introductory or elementary leather craft kit and its useful life is more than sufficient for such purpose.

It should be understood that various changes can be made in the form, details, arrangement and specific materials without departing from the spirit of the invention.

I claim:

1. A leather carving tool comprising a molded plastic exteriorly cylindrical body having top and bottom ends and having socket portions entrant from said top and bottom ends, an upwardly open generally U-shaped finger saddle having a stem extending downwardly therefrom and rotatably supported in said top socket portion, the lower end of said bottom socket portion comprising a noncircular shallow recess of greater cross-sectional area than that of the remainder of the socket portion, a cutter having an elongated shank partially held in said bottom socket portion, said shank having a medial enlargement of a shape to nonrotatably fit said shallow recess, and the projecting end of said shank being sharpened.

2. The structure in claim 1, and said bottom socket portion having its wall tapered downwardly and outwardly, and said tool shank having complementary tapers from its medial portion to both ends and interchangeably frictionally fitting said bottom socket.

3. The structure in claim 2, and the other end of said shank being sharpened and providing a differently shaped cutting portion.

References Cited

UNITED STATES PATENTS

| 312,221 | 2/1885 | Pruim. | |
| 348,765 | 9/1886 | Neal | 30—164.9 |
| 761,391 | 5/1904 | Ohlson. | |
| 922,080 | 5/1909 | Bowers | 81—6 |

WILLIAM FELDMAN, Primary Examiner.

R. V. PARKER, Assistant Examiner.